United States Patent [19]

Ducharme

[11] Patent Number: 4,706,535
[45] Date of Patent: Nov. 17, 1987

[54] SCORING SAW

[76] Inventor: Jacques Ducharme, 5410 2nd Avenue, Montreal Quebec, Canada, H1Y 2Y3

[21] Appl. No.: 15,948

[22] Filed: Feb. 17, 1987

[51] Int. Cl.⁴ .................... B27B 5/24; B27B 33/00; B27H 19/10
[52] U.S. Cl. .................... 83/863; 83/477.2; 83/473; 83/508.2; 144/3 R; 30/164.95; 30/374
[58] Field of Search .............. 83/863, 862, 477.2, 83/473, 508.2, 861; 144/3 R; 30/164.95, 374

[56] References Cited

U.S. PATENT DOCUMENTS

| | | | |
|---|---|---|---|
| 4,058,150 | 11/1977 | Pennington | 83/862 X |
| 4,176,572 | 12/1979 | Pennington | 83/862 |
| 4,181,164 | 1/1980 | Meniconi | 144/3 R |
| 4,245,390 | 1/1981 | Bond | 30/164.95 |
| 4,308,777 | 1/1982 | Lawson | 83/863 X |

FOREIGN PATENT DOCUMENTS

| | | | |
|---|---|---|---|
| 2540109 | 3/1977 | Fed. Rep. of Germany | 83/863 |
| 2740673 | 3/1978 | Fed. Rep. of Germany | 83/862 |
| 1232800 | 5/1971 | United Kingdom | 83/863 |
| 666076 | 6/1979 | U.S.S.R. | 83/862 |

Primary Examiner—Donald R. Schran

[57] ABSTRACT

A scoring saw is disclosed for use in association with a main saw blade and disposed forwardly of the main saw blade and rotating in the opposite direction. A mechanical connection transmits the power from the main blade to the scoring blade. The mechanical connection is mounted in a longitudinal casing which is pivotally carried at one end on the axle of the main blade and which rotatively carries the scoring blade at its free end. A support assembly is constructed and arranged to vertically adjust the casing and therefore the scoring blade. An adjustment is further provided to transversely align the scoring blade with the main blade.

8 Claims, 9 Drawing Figures

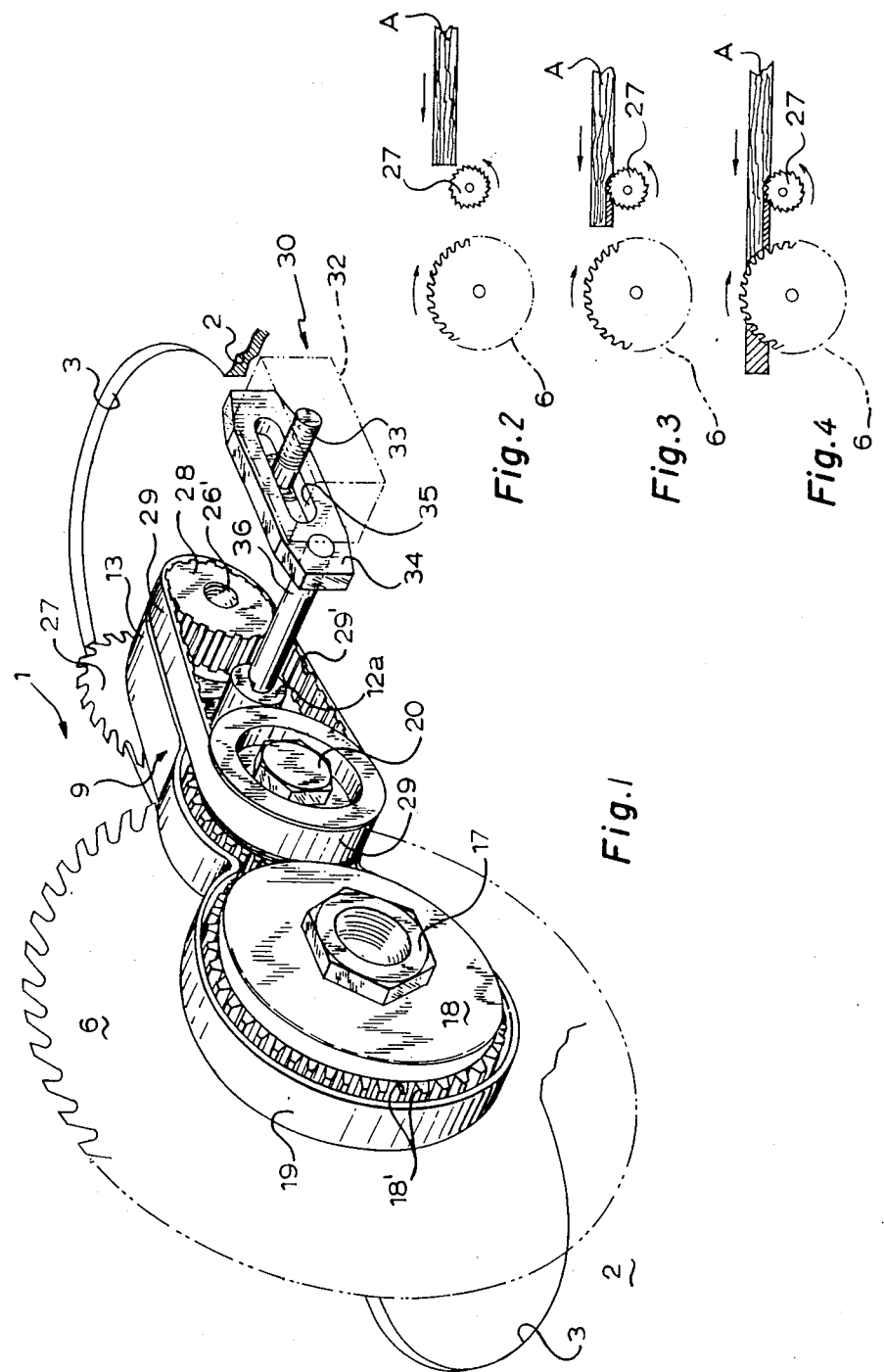

SCORING SAW

FIELD OF THE INVENTION

The present invention relates to mechanical saws in general, more specifically to a scoring saw assembly for use with a bench saw and adapted to make a score in an article immediately prior to the cutting of the article.

BACKGROUND OF THE INVENTION

When cutting wood, wood by-products or such products covered by synthetic materials, it is commonly known that the emerging blade (usually at the underside of the article being cut) often rips away small chips or pieces on either side of the cut. This ruins the finish of the cut article. Such chipping is especially troublesome when cutting melamine-covered particle board, because melamine has a low relative impact strength. (Any board having outer coatings of hard material proves to be troublesome).

There exists in the prior art bench saws adapted to overcome the above difficulty by providing a scoring saw adjacent the main cutting blade. However, the scoring saw assembly is mounted on the bench saw by the manufacturer and the user must buy the complete bench saw, even if he already owns a bench saw without a scoring saw.

OBJECTS OF THE INVENTION

In view of the above, it is a prime object of the present invention to provide a scoring saw as a kit, which can be installed on an existing bench saw not equipped with a scoring saw and with minimum modification to the existing bench saw.

It is another object of the present invention to provide a scoring saw of the above type, which is vertically adjustable.

It is yet another object of the present invention to provide a scoring saw of the above type, which has a transversely-adjustable blade allowing precise, easy alignment with the main blade.

SUMMARY OF THE INVENTION

The above and other objects and advantages of the present invention are realized according to a preferred embodiment comprising: an elongated casing adapted to be rotatively mounted at one end on the main shaft of the circular saw blade of a conventional bench saw, a scoring saw rotatably carried by the free end of the casing. A support is adapted to be fixed to the bench and supports the free end of the casing against rotation. Preferably, this support is movable to adjust the depth of cut of the scoring saw. Preferably, the scoring saw blade is adjustably mounted on its shaft to bring it into precise alignment with the main saw blade. Driving means between the two blade shafts cooperatively function to deliver power from the main saw blade shaft to the scoring blade shaft, the latter being made to rotate in the opposite direction relative to the main blade shaft.

The driving means is carried by the elongated casing and the main shaft.

BRIEF DESCRIPTION OF THE DRAWINGS

The above will be more clearly understood by having referral to the preferred embodiment of the invention, illustrated by way of the accompanying drawings, in which:

FIG. 1 is a perspective view of the scoring saw assembly according to the invention installed on the main saw blade shaft of a conventional bench saw;

FIGS. 2, 3, and 4 are sequential elevation views showing how the two saw blades are adapted to score and cut a board;

Like numerals refer to like elements throughout the drawings.

DETAILED DESCRIPTION OF THE PREFERRED EMBODIMENT

The scoring saw assembly, indicated generally at 1 is adapted for use with a conventional bench saw, the bench of which having a work supporting table 2 with an elongated opening 3, as best seen in FIG. 1.

Figure 5:
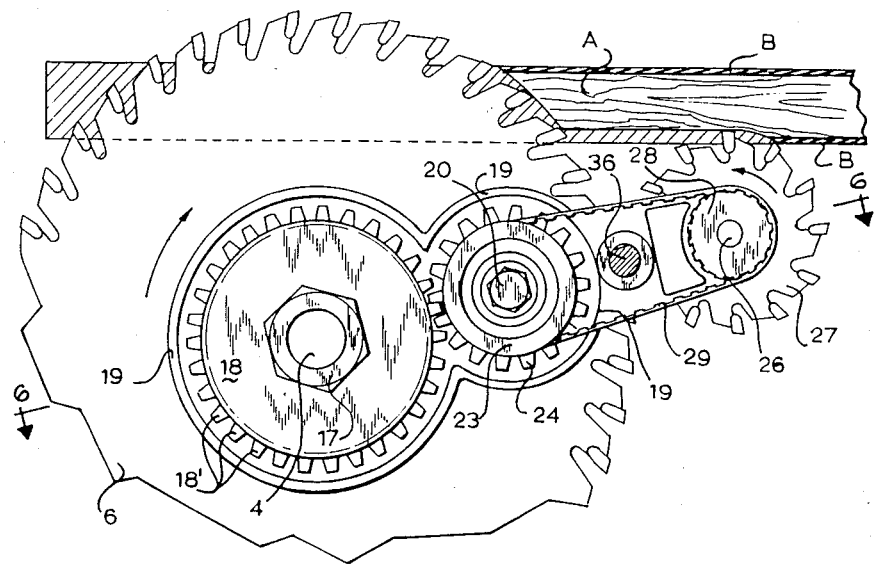
FIG. 5 is a longitudinal elevation of the assembled saws of FIG. 1, showing details of the mechanical connection means.
Figure 6:
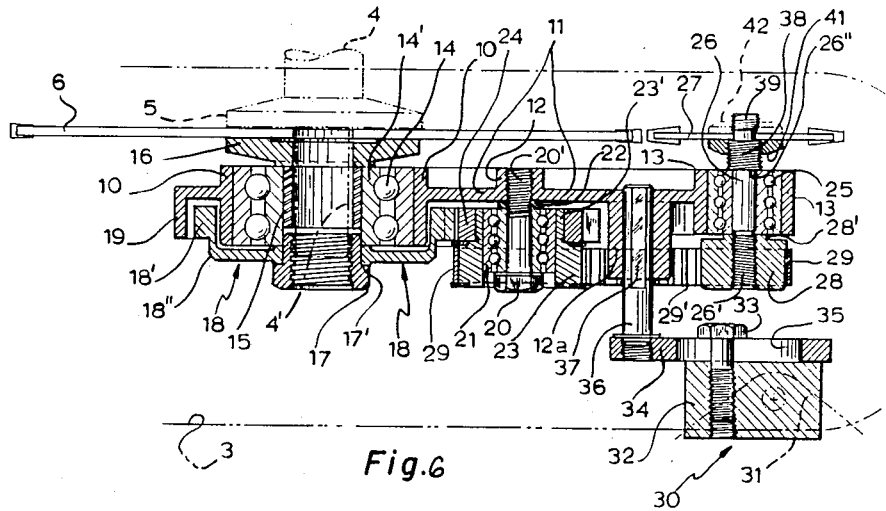
FIG. 6 is a cross-sectional view taken along line 6—6 of FIG. 5.

The bench saw carries its electric motor (not shown) which drives a main saw shaft 4 disposed below and parallel to table 2 and transverse to opening 3. As shown in FIG. 6, part of the clamping means for the larger diameter conventional circular saw blade 6 mounted on the protruding free end portion 4' of shaft 4. Portion 4' is conventionally threaded and normally an internally threaded collar (not shown) is screwed on shaft portion 4' to clamp saw blade 6 to shaft 4.

Figure 7:
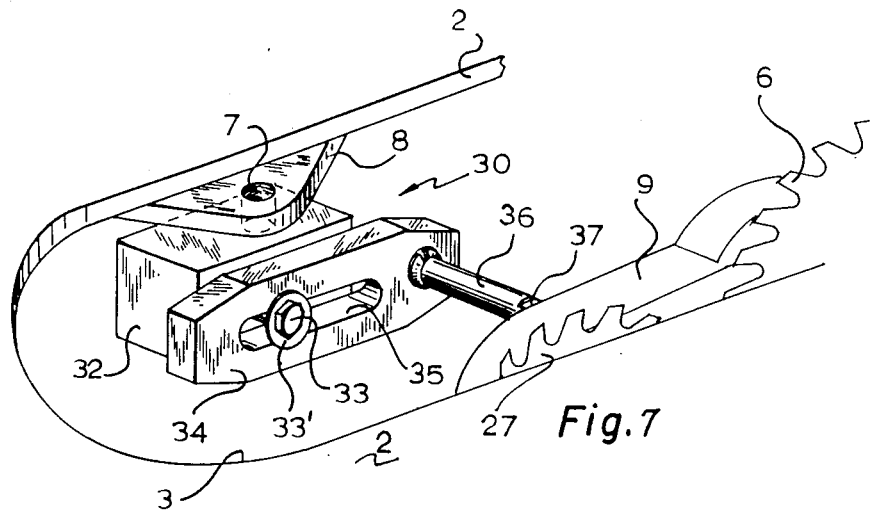
FIG. 7 is a perspective view of the support assembly installed in the opening of the bench.

Blade 6 protrudes through opening 3 and more specifically through a narrow slit of a cover plate (not shown) fitting opening 3 and removably secured flush with work supporting table 2 by means of bolts screwed into threaded holes 7 of four recessed ears 8 integral with table 2 and protruding within opening 3 (see FIG. 7).

Scoring saw assembly 1 comprises an elongated one piece, cast casing 9 having a rear large annular portion 10 extended forwardly into a vertical inner wall portion 11. Wall portion 11 is formed with a first internally threaded sleeve 12 and a second longer sleeve 12a. Spaced forwardly of sleeve 12a is a small annular terminal portion 13. The casing is preferably made of cast aluminum.

Large annular portion has mounted therein a double ball bearing 14 through the inner race 14' of which slidably fits a bushing 15 which in turn slidably fits over threaded shaft portion 4'. A saw blade clamping collar 16 slidably fits shaft portion 4' between saw blade 6 and inner race 14' and bushing 15.

A hexagonal-head nut 17 is tightly screwed onto the end portion 4' of the shaft 4. Nut 17 defines an annular shoulder at 17'. Shoulder 17' and the opposed face of inner race 14' of ball bearing 14 combine to define a tightenable space in which is fixedly secured the hub of a large spur gear 18. It is apparent that tightening of nut 17 tightens spur gear 18, inner race 14', collar 16 and saw blade 6 against abutment collar 5 so that all these parts will rotate as a unit with shaft 4.

The teeth 18' of gear 18 are located at the end of an orthogonally bent circumferential portion 18" (see FIG. 6) and spacedly overlap annular portion 10.

The greater portion of the circumference of annular portion 10 is integrally formed with a radially outer, guard flange 19, of L-shaped cross-section, which spacedly overlaps gear teeth 18' to effectively protect said teeth from flying material. Flange 19 further extends to terminal annular portion 13 and merges with the latter, as best seen in FIG. 1.

An elongated hex-head bolt 20 has an end portion 20' threadedly engaged in sleeve 12. Bolt 19 constitutes a shaft.

Mounted on bolt 20 is a triple ball bearing 21, the inner race of which is tightened against a washer 22. Mounted in turn on bearing 21 is a driving pulley 23 having a slender neck portion 23' on which is rigidly secured a small second spur gear 24. Gear 24 is adapted to mesh with gear 18.

Contrary to shaft 11, bolt 19 is fixed and the rotating elements include the outer race of bearing 21, pulley 23, neck portion 23' and spur gear 24.

Terminal annular portion 13 of the casing 9 is also fitted with a ball bearing 25 (see FIG. 6 again) in which is journalled a small saw blade shaft 26. Shaft 26 carries a small, scoring saw blade 27. The opposite end of shaft 24 carries a driven pulley 28, the latter being screwed on threaded portion 26' of shaft 26 and tightened at its central annular rib 28' against the inner race of bearing 25; this inner race being in turn tightened against a shoulder 26" of shaft 26. Pulley 23 drives pulley 28 by means of an endless belt 29 which preferably has a toothed inner surface 29' to match the teeth of pulleys 23 and 28.

FIGS. 2-5 clearly show how the scoring saw of the invention functions: a long board A, coated with melamine B or other similar hard, brittle substances is fed on table 2 from right to left. Scoring blade 27 rotating in counterclockwise direction, cuts into and not out of the bottom surface of board A) thereby preventing any chipping of the board or coating B. Then, as board A is further moved along, the main blade 6 finishes the cut, working into the top of board A, as shown. Thus a precise perfect cut is obtained without chipping at both board surfaces.

The above described elements constitute the driving means.

Scoring blade 27 is vertically adjustable. This is achieved by providing a support assembly 30 having an adjustable link. Assembly 30 comprises a rectangular block 32 which is rigidly attached to an ear 8 under the latter by means of a bolt screwed in hole 7. A long bolt 33 is adjustably threaded in block 32. An adjustment member 34 extends in contact with one face of block 32 and has a longitudinal slot 35 formed therein through which extends long bolt 33. Slot 35 is made in the front portion of member 34, while the rear end of member 34 has secured thereto a transversely projecting rigid link member or rod 36. The opposite end of link 36 is rotatably retained in sleeve 12a and has a flat 37.

Figure 9:
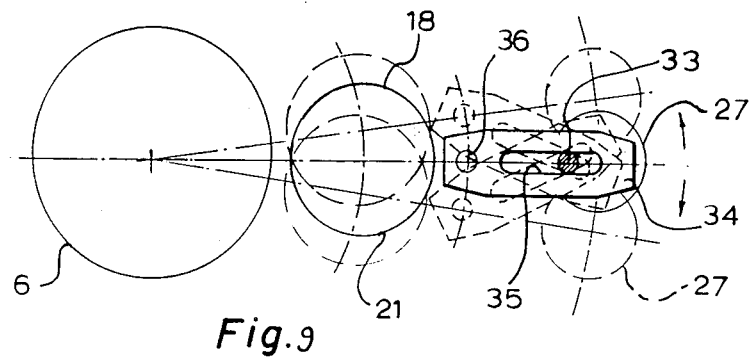
FIG. 9 is a diagrammatic longitudinal view of the main saw and scoring saw assembly, showing the manner and range of vertical adjustment.

FIG. 9 shows how the casing 9 may be pivoted about the axis of main shaft 11 merely by loosening bolt 33 and moving member 34 upwardly or downwardly, then retightening bolt 33 against a washer 33'. Thus scoring blade 27 can be positioned for a cut of any depth or simply lowered out of the way to permit main saw blade 6 to cut independently.

Figure 8:
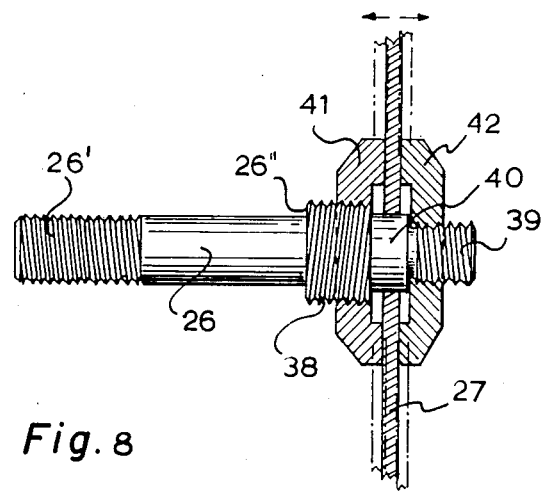
FIG. 8 is a side elevation and section showing the scoring blade and its shaft and transverse scoring blade adjustment means.

Referring finally to FIG. 8 there is shown the transverse adjustment means of small saw blade 27. The operative end of shaft 24 has a large diameter threaded segment 38 and a small diameter reversely threaded segment 39 at its end.

To adjust the blade 27, which fits around intermediate smooth segment 40, an abutment collar 41 is first screwed around segment 38 until its flat face contacts blade 25 with the latter in alignment with main blade 6. Then another abutment collar 42 is screwed onto segment 39 until its respective flat face abuts saw blade 25 to lock the latter into place by the reverse threading of the two segments 38, 39. The slit of the conventional cover plate closing table opening 3 is simply extended forwardly for the passage of scoring blade 27.

What I claim is:

1. A scoring saw assembly for use in association with a conventional bench saw having a table with a longitudinal opening, a power operated main shaft mounted parallel to the plane of said table and transverse to said opening, and a main saw blade secured to said main shaft and protruding through said opening, said assembly comprising: a rigid elongated casing adapted to extend forwardly of and to be rotatably mounted on said main shaft at its rear end, a scoring saw blade shaft rotatably carried by the front end of said casing about an axis parallel to that of said main shaft; driving means carried by said casing and including a first gear adapted to be fixed to said main shaft for driving a scoring blade fixed on said scoring blade shaft in opposite rotational direction to that of said main blade; and a support assembly adapted to be fixedly secured to said table and to said front end of said casing.

2. The scoring saw assembly of claim 1, wherein said driving means further includes a second gear carried by said casing and meshing with said first gear, a first pulley fixed to said second gear, a second pulley fixed to said scoring blade shaft and belt means trained on said first and second pulleys.

3. The scoring saw assembly of claim 2, wherein said casing is formed with a rear annular portion adapted to be journalled on said main shaft; a vertical inner wall portion extending forwardly therefrom; said wall being formed with a first internally threaded sleeve and a second sleeve spaced forwardly of said first sleeve; a threaded shaft screwed into said first sleeve and carrying said second gear and said second pulley and a link rod rotatable in said second sleeve.

4. The scoring saw assembly of claim 3, wherein said casing further includes a guard flange spacedly surrounding said first and second gears.

5. The scoring saw assembly of claim 1, wherein said support assembly includes adjustment means to secure the front end of said casing to said table in adjusted rotated position.

6. The scoring saw assembly of claim 3, wherein said bench saw table is of the type including recessed ears protruding into said opening and adapted to retain a cover plate for said opening, said support assembly including a block adapted to be rigidly secured to one of said ears underneath the latter; a long bolt adjustably threaded therein; an adjustment member extending in contact with one face of said block and being formed with a longitudinal slot through which said long bolt passes; said link rod secured at one end to said adjustment member, rearwardly of said long bolt, whereby the entire casing may be vertically pivoted about the axis of said main shaft by adjusting the position of said adjustment member with said long bolt and said longitudinal slot.

7. The scoring saw assembly of claim 1, wherein said scoring saw blade shaft is provided with transverse adjustment means for adjusting the position of said scoring blade along said scoring blade shaft.

8. The scoring saw assembly of claim 7, wherein said transverse adjustment means consists of a larger diameter threaded segment provided at the end portion of said scoring saw blade shaft and a reversely threaded smaller diameter segment provided at the end of the scoring saw blade shaft; an intermediate smooth segment between the two threaded said segments; said scoring saw adapted to be mounted on said smooth segment; a first abutment collar threaded around said larger diameter segment and a second abutment collar threaded around said smaller diameter segment, said scoring saw blade being clamped between the two said abutment collars.

* * * * *